United States Patent Office 3,545,988
Patented Dec. 8, 1970

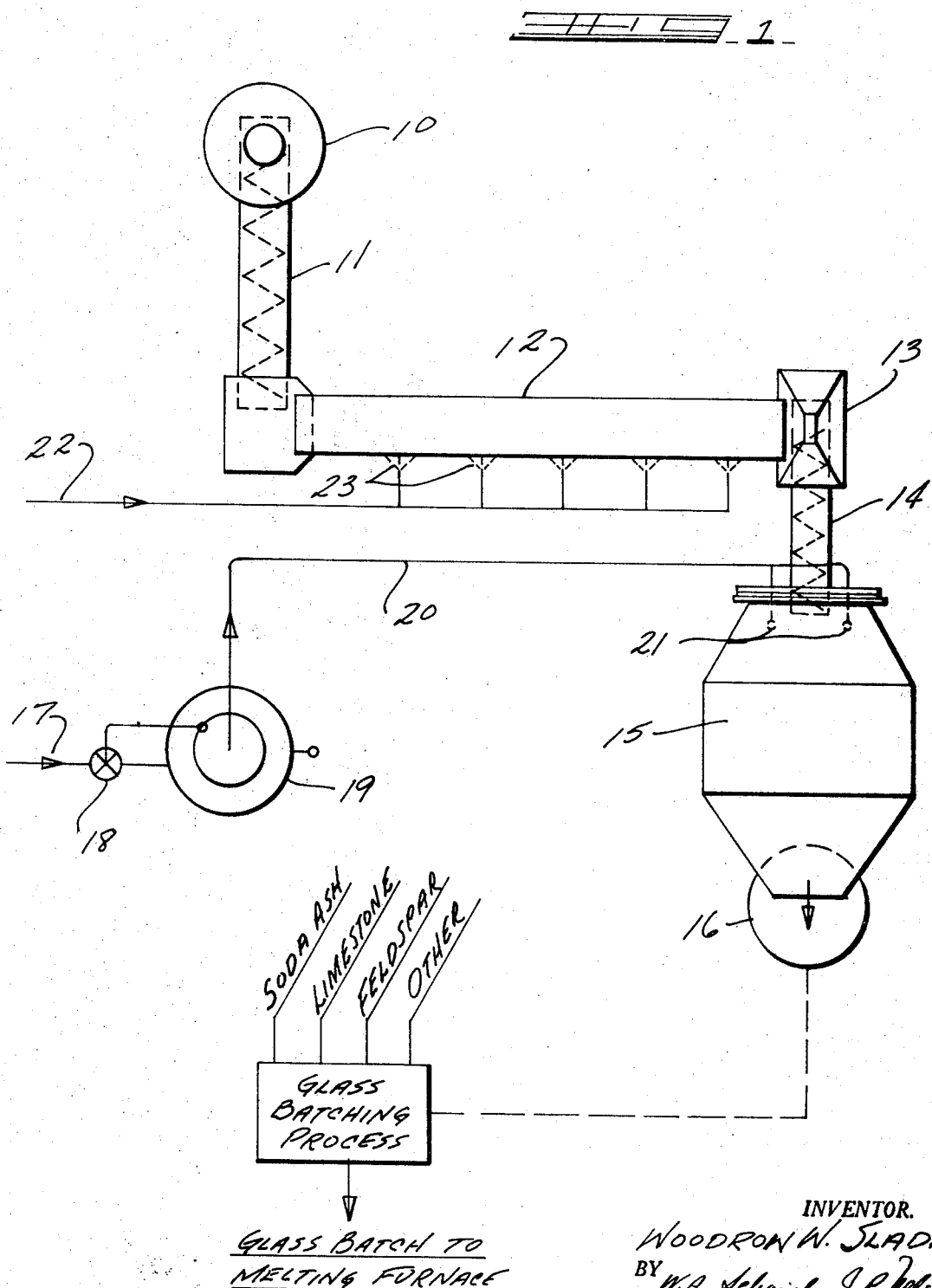

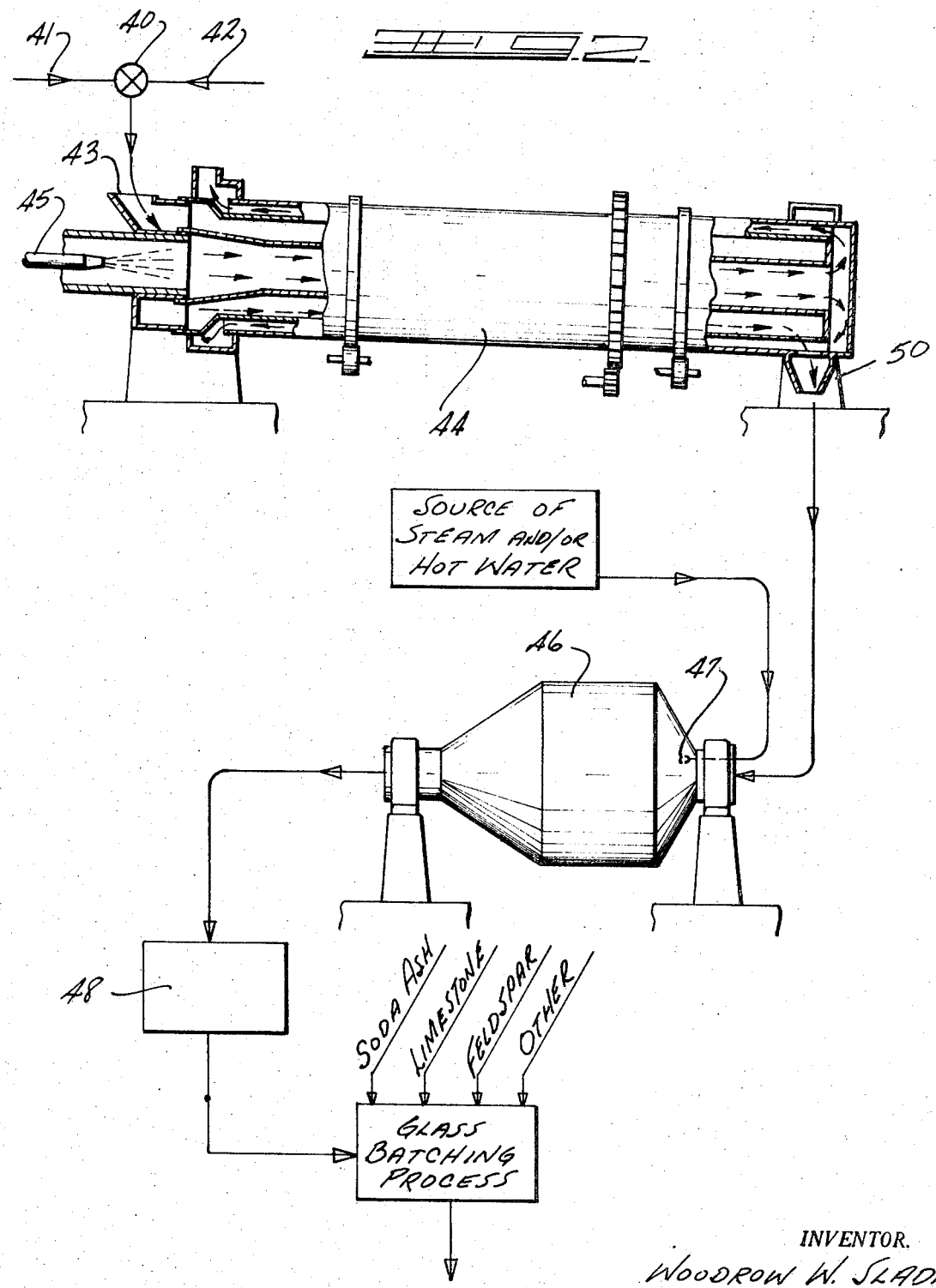

3,545,988
GLASS MANUFACTURING METHOD
Woodrow W. Slade, Walnut Creek, Calif., assignor to Owens-Illinois, Inc., a corporation of Ohio
Filed Sept. 21, 1966, Ser. No. 581,026
Int. Cl. C03c 3/04, 1/02; C03b 1/00
U.S. Cl. 106—52
4 Claims

ABSTRACT OF THE DISCLOSURE

The method of making a glass by agglomerating at elevated temperatures a batch containing sand and light soda ash by partial hydration of said soda ash to form a free flowing agglomerate, mixing said agglomerate with other batch ingredients, introducing the bath into a melting furnace and then melting the batch.

The present invention relates to glass making batches and methods of making and using the same. More particularly, the invention relates to the treatment of batch materials and the conversion of these materials into molten glass.

In the production of glass, it is common practice to feed glass batch consisting of a mixture of various ingredients such as sand, soda ash and limestone, with or without other suitable materials including fluxes such as alkali metal oxides and salts, and coloring agents, into a melting tank and heating the batch to melting temperatures.

In the past when the batch materials were introduced into the melting chamber, portions of the batch materials were removed from the surface of the batch and carried into the gas and flame streams which are played over the batch or charge during melting. As the products of combustion are carried away from the furnace melting chamber, the batch materials which leave the batch are carried out of the furnace by the force of the moving gases. This batch dust gradually coats the checkers of the regenerators, resulting in a loss of furnace draft and necessitating a frequent cleaning of the checkers of the regenerative or recuperative type of glass melting furnace which causes a loss in production.

This dusting problem is associated with the condition of the batch materials. When powdery batch mixtures are charged into the furnaces, no matter how intimately admixed before hand, or how carefully fed into the furnace, the above mentioned dust cary-over as well as other problems such as lack of homogeneity, melt segregation, volatilization of some constituents, in addition to the formation of cords, seeds, and striae in the finished glass articles often result.

In the past, these batch dusting problems have been particularly acute when light soda ash is used as batch material. In fact, these dusting problems have been so severe that use of the light soda ash as a batch material is not economically practical even though the light ash itself is relatively inexpensive.

The term "light soda ash" is well known in the art, and refers to pure $Na_2CO_3$ which has not gone through the process of hydration. Light soda ash has a bulk density of about 30–40 lbs./ft.$^3$ in comparison to the sodium carbonate monohydrate ($Na_2CO_3 \cdot H_2O$), which has a bulk density of about 55–65 lb./ft.$^3$.

Commercial grades of light soda ash usually are of the following approximate screen analysis:

| Mesh (meshes per in. of screen) | Weight percent |
|---|---|
| +30 | <1 |
| 40 | 1 |
| 100 | 12 |
| 140 | 31 |
| 200 | 44 |
| −325 | 11 |

In view of the above, it is apparent that a substantial contribution to the art would be realized if batching techniques were developed to substantially reduce batch dusting and the other problems associated with the handling, charging and melting of the finely divided light soda ash as a glass batch material.

It is, therefore, an important object of the present invention to provide an improved method of pretreating glass batch materials so as to materially reduce batch dusting.

Another object of the present invention is to provide a method of treating a glass making batch containing sand and soda ash as major constituents to reduce dusting and segregation within the batch, and to promote dust-free, rapid melting of the batch when light soda ash is present as a batch material.

A further object of the present invention is to provide an improved method for forming a glass-making batch, which includes sand and soda ash, as well as other compatible glass-forming ingredients.

Yet another object is to provide a glass-forming batch having incorporated therein an intimate admixture of sand and hydrated soda ash, which materially reduces batch dusting and batch segregation tendencies.

Another important object of the present invention is to provide a method for hydrating light soda ash, in the presence of glass batch sand to reduce batch dusting, that can be readily incorporated into existing batching processes.

A further object of this invention is to provide a method for reducing batch dusting wherein light soda ash is used as a batch ingredient.

In attaining the objects of this invention, one feature resides in hydrating soda ash in the presence of glass batch sand at elevated temperatures, to form a free flowing agglomerate, and using said agglomerate as a batch ingredient.

The above as well as other objects, features and advantages of the present invention will become apparent to those skilled in the art from the following detailed description and claims.

FIGS. 1 and 2 illustrate in part, apparatus that can be used in practicing the present invention on either a continuous or batch basis.

In FIG. 1, the appropriate amounts of sand and light soda ash are mixed in a suitable mixer (not shown) and stored in the feed hopper 10. From the feed hopper this mixture is transferred to the gas fired rotary kiln 12 by means of the kiln feeder conveyor 11. Kiln 12 is fired through burner ports 23 supplied by gas supply line 22. The sand and light soda ash are heated in the kiln and pass into hydrating chamber 15 through kiln discharge chute 13 and feeder 14. Steam, generated in steam boiler 19, is introduced into the hydrating chamber 15, through nozzles 21 in sufficient amounts to convert at least a portion of the light soda ash to sodium carbonate monohydrate and thereby forming a sand-soda ash agglomerate in chamber 15. Water is supplied to boiler 19 from water line 17 through control valve 18. The agglomerated product is then withdrawn and stored in hopper 16 for eventual use as a constituent in the glass batching process.

In FIG. 2, the appropriate amounts of sand and light soda ash are fed to the mixing valve 40 by means of their respective conveyors 41 and 42. The resulting mixture of sand and light soda ash are directed into the kiln intake port 43, and travel through the rotary gas fired kiln 44. Heated air and combustion gases are directed from a furnace (not shown), into kiln 44 through inlet port 45. The sand and soda ash mixture is heated indirectly to minimize dusting as indicated in the drawing.

The heated sand-soda ash mixture is transferred from the kiln 44, through the kiln discharge port 50 and into the rotary mixer 46. Steam and/or hot water is directed into rotary mixer 46 through spray nozzle 47 in sufficient amounts to convert at least a portion of the light soda ash to sodium carbonate monohydrate. The agglomerated sand-soda ash mixture is directed to storage hopper 48 for eventual use as a constituent in the glass batching process.

The methods of the present invention may be practiced in conjunction with any glass batch utilizing sand and soda ash as batch materials.

Ordinarily the glass compositions advantageously employed in conjunction with the inventive features of this invention are the glasses of the soda-lime-silica system. Exemplary compositions of this type are within the following range.

| Oxide: | Percent by weight |
|---|---|
| $SiO_2$ | 60–75 |
| $Al_2O_3$ | 0.1–10 |
| CaO | 6–14 |
| BaO | 0–1 |
| MgO | 0–8 |
| $B_2O_3$ | 0–5 |
| $Na_2O$ | 10–20 |
| $K_2O$ | 0–3 |
| $Fe_2O_3$ | 0–1 |
| S= | 0–0.2 |

The term "sand" as used above, refers to any sand of glass batch quality and particle size, although this invention is of particular utility in reducing batch dusting when the sand is extremely fine.

The exact reason for the unexpected improvement in batch handling properties derived from the present invention is not well understood, although it is suspected that the individual particles of sand are coated with a thin coating of the sodium carbonate monohydrate to form an agglomerate that is surprisingly free-flowing and resistant to segregation.

In the usual embodiment of the present invention, the entire batch requirements of sand and soda ash are agglomerated and admixed with the other batch materials in the glass batching process, by methods of the invention, before charging to the glass melting furnace.

The methods of the present invention also include adding the light soda ash in two stages; that is, a portion of the soda ash may be agglomerated by hydration with the sand, and a portion may be added directly in the glass batching process with the other batch constituents. I have found, however, that the dusting problems are reduced in proportion to the amount of soda ash that is agglomerated with the batch sand, and therefore it is preferred that at least about one-half of the batch requirement of soda ash is agglomerated with the sand.

The amount of water added to agglomerate the sand-soda ash mixture should be sufficient to react with the light soda-ash present to form the monohydrate. In other words, for every 106 pounds of $Na_2CO_3$ (molecular weight of $Na_2CO_3$) present there should be about 18 pounds of water (molecular weight of water) added either in the form of hot water or steam to achieve total conversion to the monohydrate. It is to be understood, however, that a lesser amount of water may be added if only a portion of the $Na_2CO_3$ is to be converted to the $Na_2CO_3 \cdot H_2O$ in the agglomeration process. Also, it is to be understood that more than 18 pounds of water may be used without detrimental effect since excess free water is not detrimental to the batch handling characteristics.

In general, the amount of water is less than 30 lbs. $H_2O$ per 100 pounds of $Na_2CO_3$ present in the sand-soda ash mixture.

The sand-soda ash mixture is usually preheated to about 150° F., before mixing with the water in the process of agglomeration by hydration. The temperature of this mixture usually varies in the range of 150° F. to 300° F. and higher. Temperatures above 300° F., are not particularly detrimental but are uneconomical from a processing standpoint. The water should be at least 180° F., and in the usual embodiment of the present invention, the water is in the form of steam. It is therefore, intended that the term "water" as used in the specification and claims, include the vapor form (steam) as well as the liquid form. The temperature range for the water is usually 180° to 250° F., in the ordinary embodiments of the present invention.

The following examples will more specifically define the principles of the present invention, although they should not be interpreted by way of limitation.

EXAMPLE I

In preparing a molten soda-lime flint glass, by ordinary melting and fining procedures, from the batch ingredients.

| Ingredient: | Part by weight, pounds |
|---|---|
| Sand | 2000 |
| Light Soda Ash | 664 |
| Limestone | 665 |
| Feldspar | 272 |
| Gypsum | 22 |

All of the sand and light soda ash are premixed and placed in a hopper similar to the hopper 10 in FIG. 1. The sand and light soda ash are fed into the rotary kiln 12 and heated to about 170° F. The heated sand-soda ash mixture is then fed by feeder 14 into the hydrating chamber 15. Steam is introduced into chamber 15 through steam nozzles 21 from steam boiler 19. The amount of steam introduced is equivalent to about 17 pounds of liquid water per 100 pounds of light soda ash. In other words, there is the equivalent of 113 pounds of liquid water introduced in the form of steam for the entire batch.

The hydrated, agglomerated, sand-soda ash mixture is withdrawn into storage hopper 16. The mixture is observed to be in the form of a finely pelletized agglomerate, exhibiting unexpected free-flowing properties.

The sand-soda ash agglomerate is then mixed with the other batch constituents in the glass batching process and charged to an ordinary glass melting furnace, and the batch is melted and refined. The amount of dust carry over was observed to be materially reduced as evidenced by the amount of batch dust accumulating on the checker work in the regenerator.

The finished glass is of the following composition:

| | Percent |
|---|---|
| $SiO_2$ | 72 |
| $Al_2O_3$ | 1.9 |
| CaO | 12.2 |
| MgO | 0.1 |
| $Na_2O$ | 13.6 |
| $K_2O$ | 0.1 |

The melting and refining conditions for rendering molten and useable glass batch of the present invention are those normally utilized in the glass art. For instance, melting and refining temperatures may range from 2100° F. to 2860° F. and the melting and fining vary with temperature, particle size, efficiency of the melting furnace, and batch composition as set forth in "Handbook of Glass Manufacture," by Tooley, Ogden Publishing Company (1953) pp. 241–270.

EXAMPLE II

In preparing an amber glass of the batch constituents:

| | Pounds |
|---|---|
| Sand | 2000 |
| Light soda ash | 741 |
| Limestone | 637 |
| Feldspar | 267 |
| Gypsum | 14 |
| Iron pyrite | 6.5 |
| Sea coal | 6.5 |

All of the sand and 500 pounds of the light soda ash are premixed in a mixing station similar to that shown at point 40 in FIG. 2. The mixture is fed into kiln 44 wherein the mixture temperature is raised to about 200° F. by means of the hot gases entering through the inlet 45. The heated sand-soda ash mixture is directed through the kiln discharge port 50 and into the rotary mixer 46. Hot water at 190° F. is introduced through spray nozzles 47 in an amount equivalent to about 12 pounds of water per 100 pounds of light soda ash. In other words, 60 pounds of water are introduced for the 500 pounds of light soda ash. The sand-soda ash mixture is withdrawn from the rotary mixer 46 and placed in hopper 48. The mixture is observed to be in the form of a finely pelletized agglomerate, exhibiting desirable free flowing properties even though only a fraction $500/741$ of the light soda ash is agglomerated with the sand, and the amount of water introduced is not sufficient to completely monohydrate that portion of the soda ash that was present in admixture with the sand.

The sand-soda ash agglomerate is then charged to an ordinary glass melting furnace, after being mixed with the other batch materials in the glass batching process (including the remaining 241 pounds of soda ash) and the batch is melted and refined to form a glass by the methods of Example I.

The amount of dust carry over is observed to be substantially reduced when compared to a similar batch that had not been hydrated by the methods of the present invention.

The resulting glass is amber in color and of the composition:

| | Percent |
|---|---|
| $SiO_2$ | 71.1 |
| $Al_2O_3$ | 1.9 |
| CaO | 11.7 |
| MgO | 0.1 |
| $Na_2O$ | 14.9 |
| $K_2O$ | 0.1 |
| $Fe_2O_3$ | 0.18 |
| $S^=$ | 0.03 |

From the foregoing, it will be appreciated by those skilled in the art that I have discovered a method of reducing batch dusting in ordinary glass batches without substantially increasing the cost of the operation. In fact, by use of less expensive light soda ash, economy in the batch mix is achieved.

I claim:
1. In the method of making a glass by melting a batch containing sand and light soda ash, the steps of heating a mixture consisting essentially of said sand and at least about one-half of the batch requirements of said soda ash to a temperature of at least about 150° F., agglomerating said heated mixture into fine pellets by adding 12 to 17 pounds of water per 100 pounds of said heated soda ash, said water having a temperature of at least about 180° F., and being sprayed into said heated mixture to effect said agglomeration and to concurrently monohydrate said soda ash, mixing the resulting agglomerate with the remaining batch ingredients, and melting the resultant batch.

2. The method of claim 1 wherein said sand and the entire batch requirement of light soda ash are heated and agglomerated by monohydration.

3. The method of claim 2 wherein said water comprises steam.

4. The method of claim 1 wherein the sand and light soda ash are heated to a temperature of about 150° F. to about 300° F.

References Cited

UNITED STATES PATENTS

| 2,813,036 | 11/1957 | Poole | 106—52X |
| 3,149,983 | 9/1964 | Maris et al. | 106—52 |
| 3,214,145 | 10/1965 | Brown | 106—52X |
| 3,065,090 | 11/1962 | Hopkins | 106—52 |
| 3,081,180 | 3/1963 | Krinov | 106—52 |

TOBIAS E. LEVOW, Primary Examiner

M. L. BELL, Assistant Examiner

U.S. Cl. X.R.

65—27